United States Patent [19]
Preston

[11] 3,989,309
[45] Nov. 2, 1976

[54] APPARATUS FOR THE DISTRIBUTION OF LOOSE FIBROUS MATERIAL
[75] Inventor: George Patrick Preston, Stirling, Scotland
[73] Assignee: Imperial Group Limited, London, England
[22] Filed: Nov. 11, 1975
[21] Appl. No.: 630,905

Related U.S. Application Data
[63] Continuation of Ser. No. 464,231, April 25, 1974, abandoned.

[30] Foreign Application Priority Data
Apr. 28, 1973  United Kingdom............... 20295/73

[52] U.S. Cl................................. 302/13; 131/110; 222/194; 222/330; 302/11; 302/27
[51] Int. Cl.² ........................................ B65G 53/46
[58] Field of Search................. 302/5, 7, 58, 11–13, 302/27, 28; 198/62; 222/194, 330; 131/108, 110, 109 R

[56] References Cited
UNITED STATES PATENTS

| 2,948,569 | 8/1960 | Bodner | 302/28 |
| 3,544,167 | 12/1970 | Fuchu et al. | 302/27 |
| 3,665,932 | 5/1972 | Goldbach | 131/110 |

FOREIGN PATENTS OR APPLICATIONS

| 1,424,508 | 2/1976 | United Kingdom | 302/11 |

Primary Examiner—Evon C. Blunk
Assistant Examiner—Jeffrey V. Nase
Attorney, Agent, or Firm—Larson, Taylor and Hinds

[57] ABSTRACT

Loose fibrous material, e.g. cut tobacco, is distributed via a horizontal rotor drum in a housing; the drum having external rakes for picking up tobacco deposited on an ascending portion of the drum and presenting it to suction-operated, draw-off pipes in a top portion of the housing. Tobacco which is not drawn-off is carried around on the rotating drum for re-presentation to the pipes. This re-cycling avoids an external return system and degradation of the tobacco.

6 Claims, 3 Drawing Figures

APPARATUS FOR THE DISTRIBUTION OF LOOSE FIBROUS MATERIAL

This is a continuation of application Ser. No. 464,231, filed Apr. 25, 1974, now abandoned.

This invention relates to apparatus for the distribution of loose fibrous material, e.g. cut tobacco or sheep's wool.

The invention may be used for the distribution of cut tobacco from a tobacco store to the supply hoppers of cigarette making machines or for the distribution of cut rolled stem (C.R.S.) tobacco. Hitherto, tobacco fed to distributing apparatus and not immediately distributed was recycled via an external return system which not only occupied more space but resulted in degradation of the tobacco. One object of the present invention is to provide a compact distributing apparatus which minimises any degradation of tobacco fed to the apparatus but temporarily not distributed.

According to the present invention, apparatus for the distribution of loose fibrous material comprises a drum rotatable about a horizontal axis and provided with an external series of circumferentially-spaced longitudinal rakes, and a housing whch surrounds the drum and has an inlet through which the material can be deposited on the drum, wherein the inlet is so located that material supplied to it is deposited on an ascending portion of the rotating drum and a top portion of the housing has at least two outlets for the removal by suction of material deposited on the drum, material not so removed being carried round on the drum for re-presentation to the outlets.

The invention is illustrated by way of example in the accompanying drawings in which.

Figure 1:
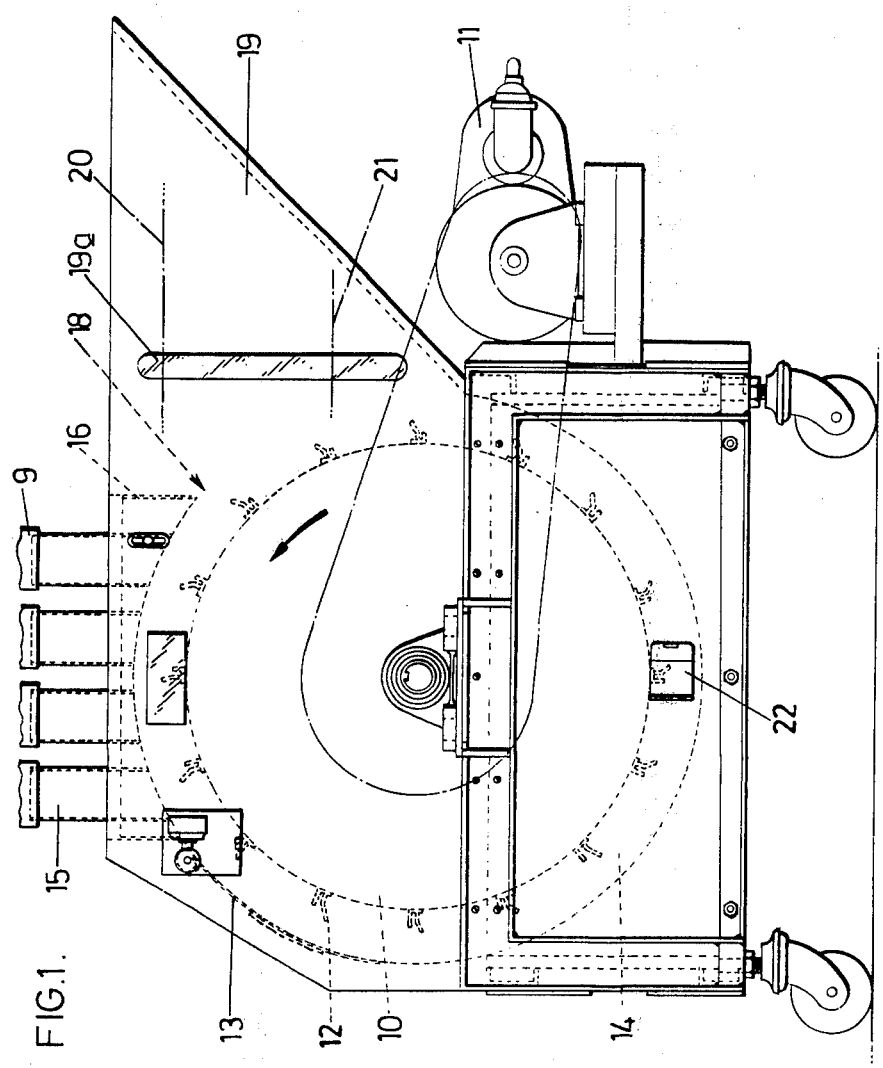
FIG. 1 is an end view of apparatus for distributing cut tobacco.
Figure 2:
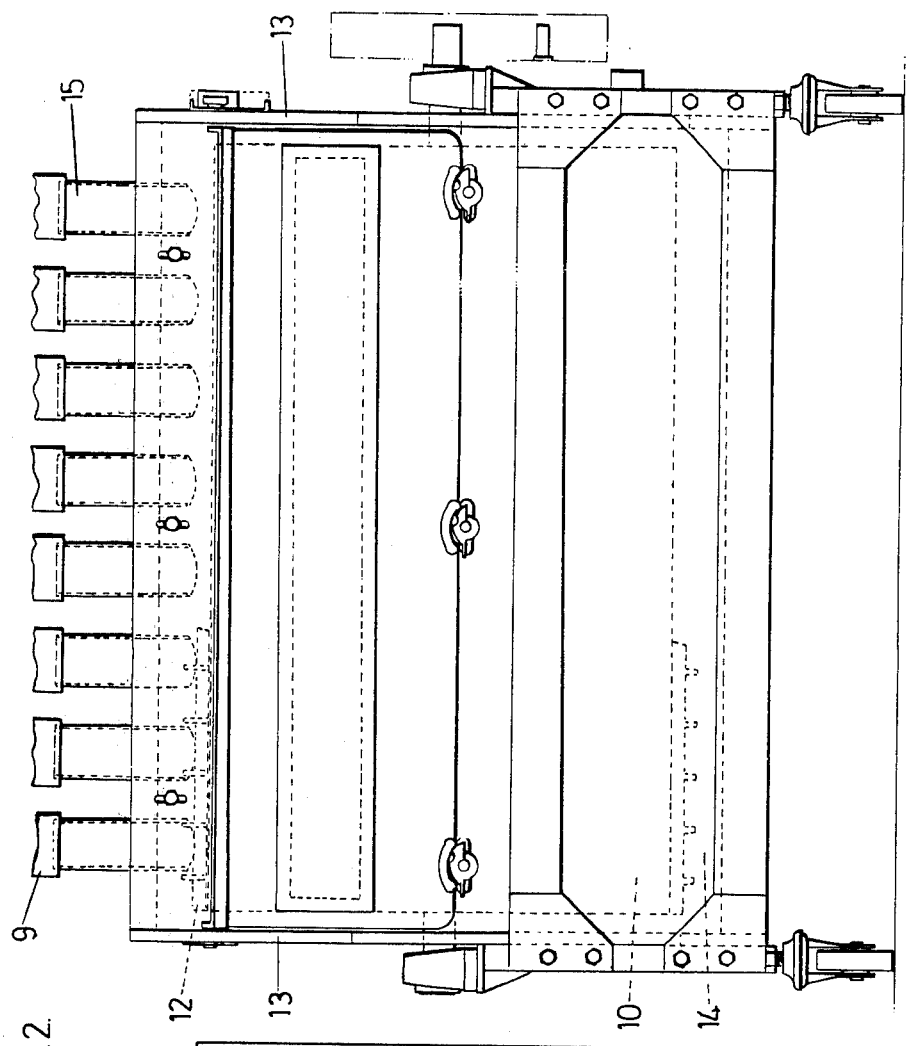
FIG. 2 is a side view of the apparatus.

The apparatus illustrated is used for the distribution of cut tobacco from storage to the supply hoppers of cigarette making machines by means of a pneumatic suction system which connects the apparatus with the hoppers of the cigarette making machines.

Referring to the drawings, a cylindrical rotor drum 10 which is rotatable about a horizontal axis is driven by a variable speed motor 11 and provided with an external series of circumferentially-spaced longitudinal rakes 12 for picking up the cut tobacco, each rake comprising a fence having teeth spaced at intervals along it. The rotor drum 10 is mounted within a cylindrical housing 13, an annular space 14 being provided between the rotor drum 10 and its housing 13 to allow sufficient clearance for the rakes 12 to obviate possible blockage by the tobacco. Several rows of vertical draw-off pipes 15 are located in an apertured top portion of the housing, the upper end of each pipe connecting with ducting 9 which forms part of a pneumatic suction system leading to the supply hoppers of cigarette making machines. Every four successive pipes 15 is connected to a separate suction fan (not shown) but only one pipe in each set of four pipes can become operative at any given moment during distribution. This is arranged so that only one row of eight pipes is operative at a time.

The pipes 15 connect at their lower ends with the annular space 14 between the rotor drum 10 and its housing 13 to allow removal of the cut tobacco by suction. The pipes 15 are rigidly supported by a plate 16 which extends across the top portion of the housing 13 between vertical guides and has apertures through which the pipes 15 pass. The plate 16 is adjustable to vary its height above the housing and thus displace the lower ends of the pipes 15 relative to the drum and housing. By this means the suction exerted through the pipes on adjacent material deposited on the drum can be modified. As a result changes may be made in the draw-off conditions to suit changes in air velocity in the ducting 9. The housing has an inlet 18 to which is connected a hopper 19 for feeding cut tobacco to an ascending portion of the drum 10, the tobacco being picked up by the rakes 12. The inlet 18 extends upwards from a horizontal plane just below the axis of rotation of the drum 10 to adjacent the first row of pipes 15. The hopper 19 is inclined downwards at about 45° below the horizontal to meet the inlet 18 and in operation is controlled to maintain the required head measured between the level 20 of the entry to the adjacent row of pipes 15 and the mean level 21 of tobacco entry into the housing 13. A window 19a is provided for a photo-electric cell sensor of a suitable feed control system.

In operation, tobacco is directed by the inclined hopper 19 through the inlet 18 and on to the ascending side of the rotating drum 10 where it is held between the rakes 12 as it is carried round on the drum towards the draw-off pipes 15. By the time it reaches the first pipe 15 the tobacco between the rakes has formed into a carpet of substantially uniform depth. However tobacco is required by the cigarette making machines, their respective draw-off pipes 15 are operated and tobacco is drawn off the drum by suction, aided by air entrained by the incoming tobacco from the hopper 19. The drawn-off tobacco then passes to the hoppers of the cigarette making machines by means of the pneumatic ducting 9.

The tobacco which is not drawn-off from the drum 10 is recycled for presentation again to the drawn-off pipes 15 by being carried around on the drum by the rakes 12 in the annular space 14. As deficiencies of tobacco on the drum arise, these are made good by the ascending rakes picking up more tobacco from the hopper 19. A bottom access point 22 permits cleaning of the drum housing.

The recycling of the tobacco within the drum housing ensures minimum degradation of the tobacco and avoids the use of a recycling system which is external to the apparatus.

Some details of the apparatus illustrated will now be given.

| | |
|---|---|
| Rotor drum length | 4 feet 11 inches. |
| Rotor drum diameter | 3 feet. |
| Rotor drum speed | 16 r.p.m. but adjustable. |
| Rake depth | 2 inches. |
| Depth of tobacco on drum | 4 inches maximum. |
| Housing internal diameter | 3 feet 8 inches. |
| Pipe array | 4 rows of 8 pipes. |
| Pneumatic system | Fan induced velocity of 5,800 feet per minute. |
| Minimum head of tobacco in hopper | 6 inches. |
| Hopper inclination below the horizontal | 45°. |

Figure 3:
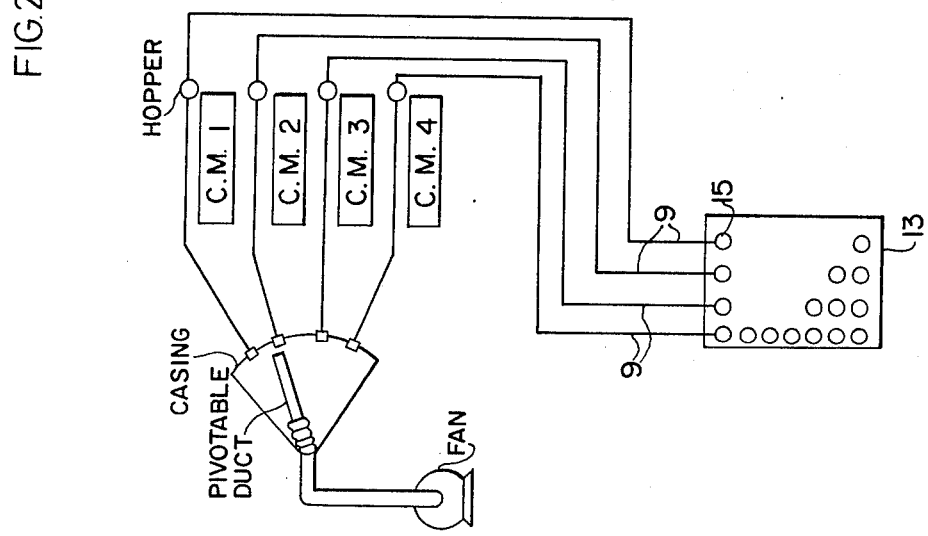
FIG. 3 illustrates schematically a system for providing selection operation of the outlets in the drum housing.

A system for providing selective operation of the outlets in the drum housing will now be described. As shown in FIG. 3, each outlet is connected by its associated pipe 15 and ducting 9 to the supply hopper of a cigarette making machine. Each set of four hoppers is connected by four ducts to four inlets of a sector-shaped casing having a single outlet. A changeover duct within the casing has one end permanently connected by a flexible section to the casing outlet. The changeover duct is pivotable about the centre of curvature of the casing so that its other end can connect with any selected casing inlet, thereby connecting the fan with the associated drum housing outlet to make the latter operative, or connects with none of the casing inlets. Each set of four housing outlets has a similar selective system. Whenever a machine hopper requires feeding, the appropriate changeover duct is moved accordingly.

What we claim is:

1. Apparatus for the distribution of loose fibrous material comprising a cylindrical drum rotatable about a horizontal axis and provided with an external series of raised rakes, each of said rakes extending longitudinally along the surface of the drum, the rakes being spaced apart circumferentially to provide a space therebetween in which a carpet of the loose fibrous material is formed into a carpet of substantially uniform depth and a cylindrical housing which surrounds the drum and has an inlet through which the material can be deposited on the drum, wherein the inlet is so located that material supplied to it is deposited on an ascending portion of the rotating drum and a top portion of the housing has at least two outlets for the removal by suction of material deposited on the drum, said housing forming with the drum an annular space which opens into said inlet and is closed between the inlet and said outlets, said drum with said rakes constituting means for carrying material not so removed on the drum through the housing for re-presentation first to the inlet at which deficiencies in the carpet are made up by additional material from the said inlet, and then to the outlets, a hopper located above said inlet and including means for holding a supply of fibrous material up to a given level to develop a head of said fibrous material, said hopper opening downwardly directly into said inlet such that the head of fibrous material in the hopper causes the fibrous material to be gravity fed from the hopper directly into the ascending portion of the drum in the path of the ascending rakes thereof.

2. Apparatus according to claim 1, wherein the outlets are selectively operable.

3. Apparatus according to claim 1, wherein the outlets are connected externally by draw-off pipes to a pneumatic suction system, the pipes being adjustably mounted so that suction exerted through them on adjacent material deposited on the drum can be modified.

4. Apparatus according to claim 3, wherein the draw-off pipes are mounted vertically on a plate which extends across the top portion of the housing between vertical guides and is apertured to receive lower end portions of the pipes, the height of the plate above the housing being adjustable to displace the pipes relative to the drum and housing.

5. Apparatus according to claim 1, wherein the inlet has an upper edge adjacent the outlets, the hopper being inclined downwards at about 45° below the horizontal to meet the inlet.

6. Apparatus according to claim 1, wherein the top portion of the housing has several rows of outlets each connecting externally with a draw-off pipe which is selectively operable.

* * * * *